US010315634B2

(12) United States Patent
Kerber et al.

(10) Patent No.: US 10,315,634 B2
(45) Date of Patent: Jun. 11, 2019

(54) METHOD FOR ADAPTING THE CONTROL STRATEGY OF A SLIP-CONTROL SYSTEM OF A VEHICLE IN A μ-SPLIT-SITUATION

(71) Applicant: Continental Teves AG & Co. oHG, Frankfurt (DE)

(72) Inventors: Henning Kerber, Darmstadt (DE); Mario Roszyk, Wehrheim (DE); Jochen Müller, Marburg (DE); Arne Cornils, Frankfurt (DE); Dieter Burkhard, Bingen-Büdesheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/433,605

(22) Filed: Feb. 15, 2017

(65) Prior Publication Data
US 2017/0158178 A1 Jun. 8, 2017

Related U.S. Application Data

(63) Continuation of application No. PCT/EP2015/065316, filed on Jul. 6, 2015.

(30) Foreign Application Priority Data

Aug. 15, 2014 (DE) .................. 10 2014 216 265

(51) Int. Cl.
B60T 8/171 (2006.01)
B60T 8/176 (2006.01)
(Continued)

(52) U.S. Cl.
CPC ............ B60T 8/1764 (2013.01); B60T 8/171 (2013.01); B60T 8/176 (2013.01); B60T 8/1761 (2013.01);
(Continued)

(58) Field of Classification Search
CPC .. B60T 8/1764; B60T 8/171; B60T 2210/124; B60T 8/176; B60T 8/1761; B60T 8/1763
See application file for complete search history.

(56) References Cited

U.S. PATENT DOCUMENTS 5,388,896 A * 2/1995 Hartmann et al. .... B60T 8/1764
                                                    303/148
5,407,258 A * 4/1995 Giers et al. ........... B60T 8/1764
                                                    303/149
(Continued)

FOREIGN PATENT DOCUMENTS

CN 101088828 A 12/2007
CN 103052546 A 4/2013
(Continued)

OTHER PUBLICATIONS

German Search Report dated Mar. 21, 2015 for corresponding German patent application No. 10 2014 216 265.3.
(Continued)

Primary Examiner — Dale W Hilgendorf

(57) ABSTRACT

The disclosure relates to a method for adapting a control strategy of a slip-control system of a brake system of a vehicle in a μ-split situation, in which different wheel-specific brake pressures, are set at opposite wheels of a vehicle axle. The resulting brake pressure difference is limited. In some examples, to generate a brake pressure request, a maximum pressure difference value deviating from a reference pressure difference with a predefined tolerance value is determined on a wheel-specific basis for the wheels lying opposite one another. The reference pressure difference corresponds to the value of the current low-pass-filtered brake pressure difference, and the brake pressure request for each wheel is determined as a minimum of the wheel-specific brake pressure determined from the control strategy of the slip-control system, and from the sum
(Continued)

of the average brake pressure of the wheel lying opposite and the wheel-specific maximum pressure difference value.

9 Claims, 2 Drawing Sheets

(51) Int. Cl.
    *B60T 8/1761*     (2006.01)
    *B60T 8/1763*     (2006.01)
    *B60T 8/1764*     (2006.01)

(52) U.S. Cl.
    CPC ....... *B60T 8/1763* (2013.01); *B60T 2210/124* (2013.01)

(56) References Cited

U.S. PATENT DOCUMENTS

| | | | | |
|---|---|---|---|---|
| 5,944,394 | A | * | 8/1999 | Friederichs et al. ......................... B60T 8/1764 303/148 |
| 6,000,765 | A | * | 12/1999 | Hinz et al. ............ B60T 8/1764 303/148 |
| 6,044,319 | A | * | 3/2000 | Rosendahl et al. ... B60T 8/1764 303/149 |
| 7,661,772 | B2 | * | 2/2010 | Heinemann ........... B60T 8/1764 303/148 |
| 2004/0138803 | A1 | * | 7/2004 | Mahlo et al. ......... B60T 8/1764 701/71 |
| 2008/0312793 | A1 | * | 12/2008 | Schutz et al. ......... B60T 8/1764 701/42 |
| 2009/0095551 | A1 | * | 4/2009 | Sawada et al. ....... B60T 8/1764 180/197 |
| 2012/0193889 | A1 | * | 8/2012 | Harrison ............... B60T 8/1764 701/70 |

FOREIGN PATENT DOCUMENTS

| | | |
|---|---|---|
| DE | 3925828 A1 | 2/1991 |
| DE | 4030724 A1 | 4/1992 |
| DE | 4038079 A1 | 6/1992 |
| DE | 4114734 A1 | 11/1992 |
| DE | 4222958 A1 | 1/1994 |
| DE | 4225983 A1 | 2/1994 |

OTHER PUBLICATIONS

International Search Report and Written Opinion dated Sep. 16, 2015 from corresponding International Patent Application No. PCT/EP2015/065316.
Chinese Office Action dated Dec. 12, 2018 for corresponding Chinese patent application number No. 201580043647.5 (PCT/EP2015/065316).

* cited by examiner

METHOD FOR ADAPTING THE CONTROL STRATEGY OF A SLIP-CONTROL SYSTEM OF A VEHICLE IN A μ-SPLIT-SITUATION

CROSS-REFERENCE TO RELATED APPLICATIONS

This application claims the benefit of PCT Application PCT/EP2015/065316, filed Jul. 6, 2015, which claims priority to German Application DE 10 2014 216 265.3, filed Aug. 15, 2014. The disclosures of the above applications are incorporated herein by reference.

TECHNICAL FIELD

The disclosure relates to a method for adapting a control strategy of a slip control system of a brake system of a vehicle in a μ-split situation.

BACKGROUND

With known slip control methods, the wheel rotation behavior is measured and used to determine wheel slip and brake pressure modulation. With wheel-specific control (individual control, single wheel control) of vehicle wheels, the brake pressure of each wheel is controlled independently of the rotational behavior of the other wheels. With this approach, it is true that small brake travels may be achieved, but for example braking on highways with different coefficients of friction (referred to as a situation) can result in a yaw torque about a vertical vehicle axis.

That is to say that if the individual vehicle wheels of a vehicle are fully controlled according to slip criteria by means of a slip control system thereof, i.e., according to the control strategy of the slip control system, large pressure differences occur very rapidly between the vehicle wheels on the high coefficient of friction side (referred to below as HM-wheels) and the vehicle wheels on the low coefficient of friction side (referred to below as LM-wheels). The pressure differences (or the longitudinal force differences) cause the yaw torque, which results in a rotation of the vehicle towards the high coefficient of friction side, which cannot be controlled by the driver in general. In order to limit the yaw torque, the wheel pressure on the HM-wheel must be limited in a suitable way.

For example, DE 42 25 983 A1 discloses a method in which the brake pressure at the wheels of an axle is reduced to reduce a yaw torque produced by an ABS control system in such a way that the difference between the brake pressures of an axle does not exceed a maximum permissible value. The maximum permissible value is dependent on the vehicle speed and the lateral acceleration.

Further, it is known to change the ABS control strategy in a μ-split situation according to the so-called "select-low principle", with which the two rear wheels are controlled to prevent locking depending on the respective vehicle wheel that is currently being operated with the lowest coefficient of friction. This means that in the μ-split situation, the brake of the rear wheel running at the higher coefficient of friction μ is only subjected to the same relatively low brake pressure as the brake of the other rear wheel running at the lower coefficient of friction, although it could also be braked harder without locking because of the higher coefficient of friction prevailing on the HM-wheel.

Further, an ABS control system with GMB (yaw torque limiting) is known from DE 39 25 828 A1, which measures the pressure on the right and left wheels input by the driver to determine the pressure difference. The permissible pressure difference is determined by comparing the target pressure with the actual pressure, and the brake pressure on the other wheel is reduced by means of a control pulse when a predetermined pressure difference is exceeded. The predetermined target pressure difference may be varied depending on the coefficient of friction on the front wheel (LM-wheel) that is running at the low coefficient of friction.

Moreover, DE 41 14 734 A1 also describes an ABS control system with GMB and without pressure sensors. In this case, a value representing the pressure difference at two opposite wheels is continuously determined from pressure reduction signals. In a μ-split-situation, the average pressure build-up gradient on the HM-wheel is varied depending on the pressure difference or the value representing the pressure difference and the deceleration of the vehicle. During the determination of the pressure difference, a weighting is applied that takes into account the profile of the brake system-related pressure reduction gradient that is initially steeper and then flatter with an asymptotic approach to zero.

Both in the cases of DE 39 25 828 A1 and DE 41 14 734 A1, determining the permissible pressure difference is carried out depending on the states of the LM-wheel and the HM-wheel as well as on the driving behavior or on the driving situation of the vehicle.

SUMMARY

The disclosure provides a method with which the pressure differences occurring at opposite vehicle wheels of an axle are limited in order to limit a yaw torque in a μ-split situation, but the limiting is carried out without a knowledge of the driving behavior or the driving situation of the vehicle.

The method for adapting the control strategy of a slip control system of a brake system of a vehicle in a μ-split situation, in which different wheel-specific brake pressures are set at opposite vehicle wheels of a vehicle axle that are determined by the control strategy of the slip control system and in which the resulting brake pressure difference is limited. A first-mentioned solution is characterized in that for producing a brake pressure demand for the opposite vehicle wheels wheel-specifically, a maximum pressure difference value is determined, which deviates from a reference pressure difference with a predetermined tolerance value, where the reference pressure difference corresponds to the value of the current low-pass filtered brake pressure difference, and the brake pressure demand for each vehicle wheel is determined as the minimum of the wheel-specific brake pressure that is determined from the control strategy of the slip control system as well as the sum of the wheel-specific brake pressure for the opposite vehicle wheel that is determined from the control strategy of the slip control system and the wheel-specific maximum pressure difference value.

A second-mentioned solution is characterized in that for producing a brake pressure demand for the opposite vehicle wheels wheel-specifically, a maximum pressure difference value is determined that deviates from a reference pressure difference with a predetermined tolerance value, where the reference pressure difference corresponds to the value of the current low-pass filtered brake pressure difference, and the brake pressure demand for each vehicle wheel is determined as the minimum of the wheel-specific brake pressure that is determined from the control strategy of the slip control system as well as the sum of the average brake pressure of the opposite vehicle wheel and the wheel-specific maximum pressure difference value.

With the method according to the disclosure, the brake pressure demands for each vehicle wheel produced by the slip control system are limited such that the pressure difference resulting from the brake pressure demands deviates about a reference pressure difference within a predetermined tolerance that corresponds to the current low-pass filtered brake pressure difference.

The actuating and control processes of the slip control system take place in a time pattern, known as a "loop". The wheel-specific pressure demands on the part of the slip control system are therefore carried out loopwise at a pressure controller of the brake system of the vehicle. This means that the brake pressure demand $P_{req,i+1,n}$ at wheel n (n=0, 1: for example, for the two wheels of the front axle) for the next, i.e., the (i+1)th loop only deviates by a predetermined tolerance from the current low-pass filtered brake pressure difference $p_{filt,diff,i}$ of the current, i.e., the ith, loop.

To produce the wheel-specific brake pressure demand $P_{req,i+1,n}$ for the (i+1)th loop, first for each wheel n a maximum pressure difference value $p_{diff,i+1,n}$ is determined wheel-specifically, which deviates with a predetermined tolerance value $p_{tol}$ from a reference pressure difference $P_{0,i}$, where the reference pressure difference $P_{0,i}$ corresponds to the value of the current low-pass filtered brake pressure difference $p_{filt,diff,i}$ of the current, i.e., the ith, loop. The low-pass filtered brake pressure difference $p_{filt,diff,i}$ used based on the knowledge that the yaw behavior of the vehicle is determined not only by the current pressure difference, but in particular by the average pressure difference of the recent past. Therefore, the low-pass filtering is used because this causes averaging of the pressure difference values of the recent past.

The wheel-specific maximum pressure difference value $p_{diff,i+1,n}$ corresponds to the maximum permitted pressure difference from the opposite wheel, which is determined by the predetermined tolerance value $p_{tol}$.

According to the first-mentioned solution, the brake pressure demands $P_{req,i+1,n}$ for the two vehicle wheels n of an axle (n=0, 1) for the next loop i+1 are determined from the wheel-specific maximum permissible pressure difference values $p_{diff,i+1,n}$ as well as from the wheel-specific brake pressures that are determined according to the control strategy of the slip control system. The brake pressures determined according to the control strategy of the slip control system are thus determined exclusively according to wheel dynamics criteria and are thereby independent of the states of the other wheels.

The second-mentioned solution differs from the first-mentioned solution in that the wheel-specific brake pressure for the opposite wheel that is determined according to the control strategy of the slip control system is not used for determination of the brake pressure demands $P_{req,i+1,n}$ for the two vehicle wheels n of an axle (n=0, 1) for the next loop i+1, but the average brake pressure thereof is used. The average brake pressure of the opposite wheel can also be modified depending on the average acceleration thereof in order to incorporate the average longitudinal force of the opposite vehicle wheel.

These methods according to the disclosure result in effective limiting of the yaw torque on the vehicle but without having to perform a situation recognition of the vehicle regarding the state thereof.

It has been found to be advantageous that according to a development identical tolerance values are used for determination of the maximum pressure difference value for the opposite vehicle wheels. A symmetrical tolerance band about the low-pass filtered brake pressure difference thereby forms over multiple loops.

If information about vehicle stability is available to the slip control system, according to aspect of the disclosure different tolerance values can be used for determination of the maximum pressure difference value for the opposite vehicle wheels, whereby an asymmetrical tolerance band arises over multiple loops.

Finally, it is particularly advantageous if according to a development of the disclosure the brake pressure difference is modified depending on the difference of the accelerations of the two mutually opposite vehicle wheels and is then low-pass filtered. Thereby not only is the average brake pressure difference relevant during the determination of the brake pressure demand, but additionally also the longitudinal force difference of the effective longitudinal force on the two vehicle wheels, because ultimately the effective longitudinal force difference on a vehicle wheel is decisive for the existence of the yaw torque.

The details of one or more implementations of the disclosure are set forth in the accompanying drawings and the description below. Other aspects, features, and advantages will be apparent from the description and drawings, and from the claims

DESCRIPTION OF DRAWINGS

The method according to the disclosure is explained and described in detail below with reference to the accompanying figures. In the figures.

Like reference symbols in the various drawings indicate like elements.

DETAILED DESCRIPTION

Figure 1:
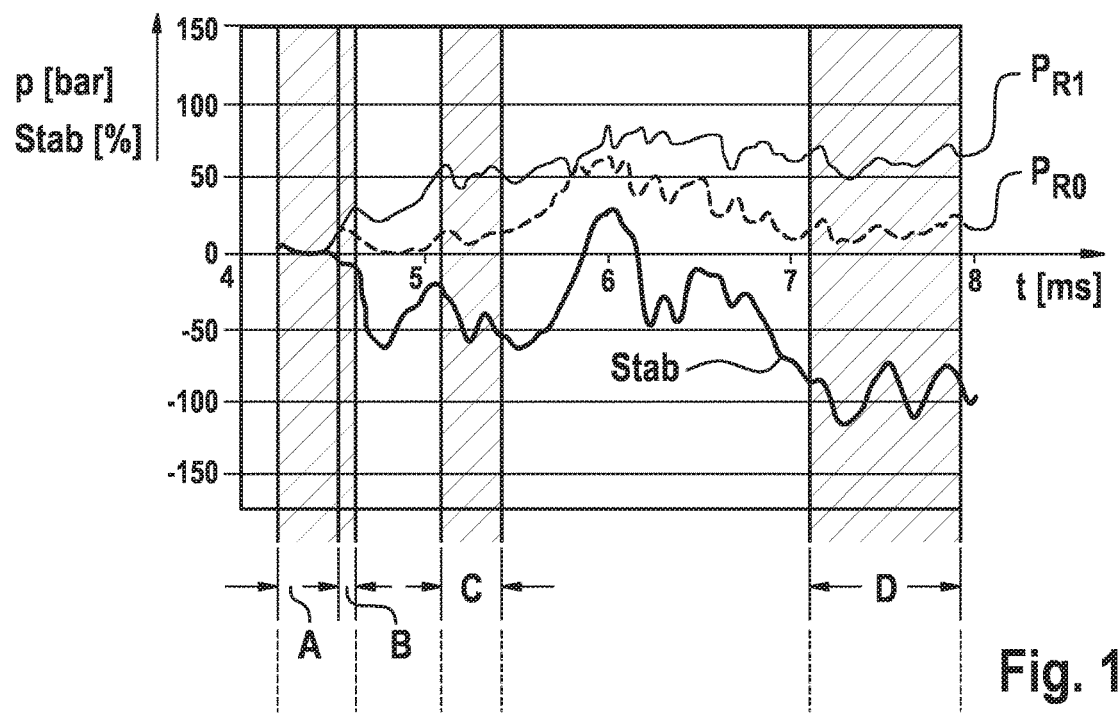
FIG. 1 shows a t-p diagram to explain the method according to the disclosure.

A vehicle with a slip control system, for example a brake system including an ABS control system, is assumed below, where the vehicle wheels can be slip-controlled by the ABS control system. Slip can occur on such a vehicle wheel and is determined by means of a difference between the circumferential speed of the wheel and the vehicle speed.

If the ABS control system detects slip or impending locking of a vehicle wheel, suitable pressure demands are produced for a brake pressure controller, whereby this is brought about in order to reduce the excessive brake pressure at the vehicle wheel. The wheel is relieved of brake pressure by this and is given the ability to run again. Once the wheel speed has equaled the vehicle speed again, the wheel may again be subjected to brake pressure. This results in pressure control cycles with pressure modulations about an average brake pressure at the vehicle wheel.

In the case of braking on a highway with different coefficients of friction split situation), in which the left front wheel (referred to as wheel 0) of the front axle of the vehicle is rolling as the LM-wheel on a low coefficient of friction side and the right front wheel (referred to as wheel 1) of the front axle is rolling on a high coefficient of friction side, the brake pressure initially increases similarly starting from the point in time of the braking for both wheels, i.e., for the HM-wheel and the LM-wheel. If the ABS control system detects a tendency to lock of the LM-wheel, it then causes a reduction in brake pressure with a downward control pressure at the LM-wheel. Then a pressure holding phase follows with a renewed pressure increase, with which a new control cycle starts at the same time.

However, during the control cycles at the LM-wheel, the brake pressure at the HM-wheel increases further until in accordance with the method according to the disclosure the brake pressure difference occurring at the opposite vehicle wheels is limited in order to attenuate an occurring yaw torque to such an extent that the vehicle remains controllable by the driver.

The permissible changes in the brake pressure differences at the two front wheels (HM-wheel 0 and LM-wheel 1) are not related to the current brake pressure differences $p_{diff}$, but to the low-pass filtered brake pressure differences $p_{filt,diff}$. The wheel-specific pressure demands $p_{req,wdc}$ of the ABS control systems are limited such that the occurring brake pressure difference $p_{diff}$ deviates at most only by a predetermined tolerance value from the low-pass filtered brake pressure difference $p_{filt,diff}$ as a reference pressure difference $p_{0,i}$. With the predetermined tolerance value a tolerance band arises about the reference pressure difference $p_{0,i}$ where the tolerance band can be applied symmetrically or asymmetrically.

The actuating and control processes of the ABS control system are carried out in a time pattern, known as a "loop". The wheel-specific pressure demands on the part of the ABS control system are therefore carried out loopwise at the pressure controller of the brake system of the vehicle. This means that the brake pressure demand $P_{req,i+1,n}$ at the wheel n (n=0, 1) of the front axle for the next, i.e., the (i+1)th, loop only deviates by a predetermined tolerance from the current low-pass filtered brake pressure difference $P_{filt,diff,i}$ of the current, i.e., the ith, loop.

For producing the wheel-specific brake pressure demand $P_{req,i+1,n}$ for the (i+1)th loop, a maximum pressure difference value $p_{diff,i+1,n}$, which deviates with a predetermined tolerance value $p_{tol}$ from the reference pressure difference $P_{0,i}$, is first determined wheel-specifically for each wheel n. The reference pressure difference $P_{0,i}$ corresponds to the value of the current low-pass filtered brake pressure difference $p_{filt,diff,i}$ of the current, i.e., the ith, loop. The low-pass filtered brake pressure difference $p_{filt,diff,i}$ is used based on the knowledge that the yaw behavior of the vehicle is not only determined by the current brake pressure difference, but in particular by the average brake pressure difference of the recent past. Therefore, the low-pass filtered brake pressure difference $p_{filt,diff,i}$ is used because the yaw behavior of the vehicle is determined not only by the actual brake pressure difference but, in particular, by the mean brake pressure difference of the near past.

The wheel-specific maximum pressure difference value $p_{diff,i+1,n}$ corresponds to the maximum permitted pressure difference from the opposite wheel, which is determined by the predetermined tolerance value $p_{tol}$.

During the calculation of the maximum pressure difference value $p_{diff,i+1,n}$ for the wheel n, depending on whether the wheel n is a right or a left wheel of the front axle, the sign of the filtered brake pressure difference must be taken into account. Thus, we get the following for the left front wheel 0 or the right front wheel 1:

$$p_{diff,i+1,0} = -p_{filt,diff,i} + p_{tol}, \quad (1)$$

and $$p_{diff,i+1,1} = +p_{filt,diff,i} + p_{tol}, \quad (2)$$

Where $p_{filt,diff,i}$ is the current low-pass filtered brake pressure difference, $p_{tol}$ is the predetermined tolerance value and $p_{diff,i+1,0}$ or $p_{diff,i+1,1}$ is the brake pressure demand for the wheel 0 or the wheel 1 for the next loop (i+1).

The tolerance value $p_{tol}$ may be selected such that the value corresponds to the magnitude of the normal pressure reductions of the wheel 0 or 1 under homogenous conditions and has no effect on the opposite wheel.

The pressure demands $P_{req,i+1,0}$ and $P_{req,i+1,1}$ for the wheel 0 and the wheel 1 are calculated according to the following equations:

$$P_{req,i+1,0} = \min(P_{req,wdc,i+1,0}, P_{req,wdc,i+1,1} + p_{diff,i+1,0}) \quad (3)$$

and $$P_{req,i+1,1} = \min(P_{req,wdc,i+1,1}, P_{req,wdc,i+1,0} + p_{diff,i+1,1}) \quad (4)$$

Where $P_{req,wdc,i+1,n}$ (n=0, 1) is the wheel-specific brake pressure for the wheel 0 and for the wheel 1 that is determined from the control strategy of the ABS control, i.e., only from wheel dynamic criteria, and $p_{diff,i+1,0}$ (n=0, 1) is the permissible maximum pressure difference value for the wheel 0 or the wheel 1.

The method according to the disclosure will be described using the following examples.

EXAMPLE 1

There is a μ-split situation, in which the left front wheel is rolling as the LM-wheel 0 on the low coefficient of friction side and the right front wheel is rolling as the HM-wheel 1 on the high coefficient of friction side and the ABS control system detects a tendency of the LM-wheel 0 to lock. Then the control strategy is regulated accordingly with a downward control pressure with $P_{req,wdc,i+1,0}=10$ bar, where the HM-wheel 1 is not yet under ABS control and therefore the value of $P_{req,wdc,i+1,1}$ is set to "infinity". The filtered brake pressure difference $p_{filt,diff,i}$ indicates the value 0.

The ABS control system first determines the maximum pressure difference value $p_{diff,i+1,n}$ (n=0, 1) for the LM-wheel 0 and the HM-wheel 1, where the tolerance value $p_{tol}$ is set to the value 20 bar, which lies symmetrically about the value of the filtered brake pressure difference $p_{filt,diff,i}$. According to the equations (1) and (2), we thus get the following:

$$p_{diff,i+1,0} = (-p_{filt,diff,i} + p_{tol}) = (0 + 20 \text{ bar}) = 20 \text{ bar}$$

and $$p_{diff,i+1,1} = (+p_{filt,diff,i} + p_{tol}) = (0 + 20 \text{ bar}) = 20 \text{ bar}.$$

Thus 20 bar more brake pressure may be applied at the wheel 0 compared to the wheel 1, similarly the brake pressure at the wheel 1 may be 20 bar more compared to the wheel 0.

For the brake pressure demand $P_{req,i+1,0}$ and $P_{req,i+1,1}$ for the wheel 0 and the wheel 1, the following results from this according to the equations (3) and (4):

$$P_{req,i+1,0} = \min(P_{req,wdc,i+1,0}, P_{req,wdc,i+1,1} + p_{diff,i+1,0}) = $$
$$(10 \text{ bar}, \text{infinity} + 20 \text{ bar}) = 10 \text{ bar},$$

and $$P_{req,i+1,1} = \min(P_{req,wdc,i+1,1}, P_{req,wdc,i+1,0} + p_{diff,i+1,1}) = $$
$$(\text{infinity}, 10 \text{ bar} + 20 \text{ bar}) = 30 \text{ bar}.$$

The pressure reduction at the LM-wheel 0 at 10 bar continues, whereas the brake pressure at the HM-wheel 1 is limited to 30 bar. The vehicle remains stable because the drifting apart, i.e., the pressure discrepancy (pressure difference) forming at the two wheels of the front axle, remains limited.

EXAMPLE 2

If starting from example 1 the μ-split control continues, a further pressure increase is carried out at the HM-wheel 1, where the pressure demand $P_{req,i+1,0}$ and $P_{req,i+1,1}$ according to example 1 result in a current brake pressure difference of 20 bar. If the brake pressure difference exists over a long period of time, in which the driver of the vehicle would have sufficient time to adapt his driving behavior, i.e., for example to steer counter to the occurring yaw torque, the filtered brake pressure difference $p_{filt,diff,i}$ also adopts the value 20 bar. The new maximum pressure difference values $P_{diff,i+1,n}$ (n=0, 1) for the LM-wheel 0 and the HM-wheel 1 are determined for the next loop (i+1) with the value, where the tolerance value $p_{tol}$ is again set to the value 20 bar. According to equations (1) and (2), the following thus results:

$$p_{diff,i+1,0}=(-p_{filt,diff,i}+p_{tol})=(-20 \text{ bar}+20 \text{ bar})=0 \text{ bar}$$

$$p_{diff,i+1,1}(+p_{filt,diff,i}+p_{tol})=(+20 \text{ bar}+20 \text{ bar})=40 \text{ bar}$$

The new values $P_{diff,i+1,0}$ and $p_{diff,i+1,1}$ again lie symmetrically about the filtered pressure difference $P_{filt,diff,i}$ of 20 bar.

For the brake pressure demand $P_{req,i+1,0}$ and $P_{req,i+1,1}$ for the wheel 0 and the wheel 1, the following results according to equations (3) and (4):

$$P_{req,i+1,0}=\min(P_{req,wdc,i+1,0}, P_{req,wdc,i+1,1}+P_{diff,i+1,0})=\\(10 \text{ bar, infinity}+0 \text{ bar})=10 \text{ bar,}$$

and $$P_{req,i+1,1}=\min(P_{req,wdc,i+1,1}, P_{req,wdc,i+1,0}+P_{diff,i+1,1})=\\(\text{infinity},10 \text{ bar}+40 \text{ bar})=50 \text{ bar.}$$

This shows that the brake pressure at the HM-wheel 1 is increased after a certain time in which the driver can adapt to the situation, i.e., for example can counter steer. The pressure discrepancy is built up further, where the increase of the brake pressure at the HM-wheel 1 benefits the braking performance.

The gradient with which the pressure discrepancy builds up is determined by the filter constant of the low-pass filtering of the brake pressure difference $p_{diff}$ of the brake pressures $p_{R0}$ and $p_{R1}$ at the LM-wheel 0 and the HM-wheel 1 of the front axle as well as the allowed tolerance value $p_{tol}$.

EXAMPLE 3

In examples 1 and 2 the permissible tolerance $p_{tol}$ was placed symmetrically about the filtered brake pressure difference $p_{filt,diff,i}$ between the brake pressures $p_{R0}$ and $p_{R1}$ of the front wheels wheel 0 and wheel 1, thus resulting in a symmetrical tolerance band. No information regarding the stability state of the vehicle is necessary here.

If, however, there is driving stability information, an asymmetrical tolerance band may be set up, so that different tolerance values are predetermined for the LM-wheel 0 and the HM-wheel 1. The asymmetrical shift of the tolerance band from the symmetrical position thereof is carried out in this case depending on the degree of stability of the vehicle.

It is assumed that the filtered brake pressure difference $p_{filt,diff,i}$ has a magnitude of 40 bar, resulting in a tolerance value of 20 bar applied symmetrically about the filtered brake pressure difference for the maximum pressure difference values $p_{diff,i+1,n}$ (n=0, 1) for the LM-wheel 0 and the HM-wheel 1:

$$p_{diff,i+1,0}=(-P_{filt,diff,i}+p_{tol})=(-40 \text{ bar}+20 \text{ bar})=-20 \text{ bar}$$

$$p_{diff,i+1,1}=(+p_{filt,diff,i}+p_{tol})=(+40 \text{ bar}+20 \text{ bar})=60 \text{ bar}$$

If, however, driving stability information shows a tendency towards instability of the vehicle, the allowed change, i.e. the tolerance value $p_{tol}$ relative to the filtered pressure discrepancy, is applied not symmetrically, but asymmetrically:

$$p_{diff,i+1,0}=-20 \text{ bar}+10 \text{ bar}=-10 \text{ bar}$$

$$p_{diff,i+1,1}=60 \text{ bar}-10 \text{ bar}=50 \text{ bar.}$$

The values correspond to a tolerance value $p_{tol,0}$ for the LM-wheel 0 of 30 bar and a tolerance value $p_{tol,1}$ for the HM-wheel 1 of 10 bar. From this the brake pressure demand $P_{req,i+1,0}$ and $P_{req,i+1,1}$ for wheel 0 and the wheel 1 is given by:

$$P_{req,i+1,0}=\min(P_{req,wdc,i+1,0}, P_{req,wdc,i+1,1}+p_{diff,i+1,0})=\\(10 \text{ bar, infinity}-10 \text{ bar})=10 \text{ bar,}$$

and $$P_{req,i+1,1}=\min(P_{req,wdc,i+1,1}, P_{req,wdc,i+1,0}+p_{diff,i+1,1})=\\(\text{infinity},10 \text{ bar}+50 \text{ bar})=60 \text{ bar.}$$

The shifting of the tolerance band is carried out such that the further change of the brake pressure difference in the destabilizing direction is carried out more slowly than in the stabilizing direction and can be varied depending on the degree of instability of the vehicle. In extreme cases, this can result not only in the increase of the pressure discrepancy in the direction of the HM-wheel 1 being slowed, but in the pressure discrepancy also being reduced.

The driving stability information can for example be determined as a deviation of an actual vehicle yaw rate or an actual vehicle yaw acceleration etc. from a target yaw rate or a target yaw acceleration determined from a model.

EXAMPLE 4

In the event of change from a homogeneous high coefficient of friction for wheel 0 and wheel 1 to a μ-split situation, in which the wheel 0 is rolling on a μ-split surface and is thereby the LM-wheel, the brake pressure at the LM-wheel 0 is reduced from 100 bar to 10 bar, whereas the HM-wheel 1 should continue to be controlled at 100 bar according to the control strategy of the ABS control system.

With a tolerance value of 30 bar symmetrically applied to the filtered brake pressure difference of 0 bar, the following results for the maximum pressure difference values $p_{diff,i+1,n}$ (n=0, 1) for the LM-wheel 0 and the HM-wheel 1:

$$p_{diff,i+1,0}=(-p_{filt,diff,i}+p_{tol})=(0 \text{ bar}+30 \text{ bar})=30 \text{ bar}$$

$$p_{diff,i+1,1}=(+p_{filt,diff,i}+p_{tol})=(0 \text{ bar}+30 \text{ bar})=30 \text{ bar}$$

from this the following results for the brake pressure demand $P_{req,i+1,0}$ and $P_{req,i+1,1}$ for wheel 0 and wheel 1:

$$P_{req,i+1,0}=\min(P_{req,wdc,i+1,0}, P_{req,wdc,i+1,1}+p_{diff,i+1,0})=\\(10 \text{ bar},100 \text{ bar}+30 \text{ bar})=10 \text{ bar,}$$

and $$P_{req,i+1,1}=\min(P_{req,wdc,i+1,1}, P_{req,wdc,i+1,0}+p_{diff,i+1,1})=\\(100 \text{ bar},10 \text{ bar}+30 \text{ bar})=40 \text{ bar.}$$

Because a greater pressure reduction from 100 bar to 10 bar is carried out at the LM-wheel 0, at the opposite wheel, i.e., at the HM-wheel 1, the brake pressure of 100 bar envisaged by the control strategy is limited to 40 bar and thereby the yaw torque on the vehicle is limited.

EXAMPLE 5

If the vehicle is located with the front wheels wheel 0 and wheel 1 on homogeneous highway surfaces, the method according to the disclosure does not result in any unnecessary limitation of the brake pressures at the two wheels 0 and 1. By way of example, it is assumed that the locking pressure level for both wheels is 100 bar according to the control strategy of the ABS controller. Furthermore, the situation is assumed whereby the ABS control requires a brake pressure reduction to 80 bar at wheel 0, whereas the pressure of 100 bar is to be maintained at wheel 1. The value for the tolerance value is 30 bar symmetrically relative to the filtered brake pressure difference $P_{diff,filt,i}$ with the value 0. There is thus no vehicle instability.

The following thereby applies for the maximum pressure difference values $p_{diff,i+1,n}$ (n=0, 1) for the LM-wheel 0 and the HM-wheel 1:

$$p_{diff,i+1,0}=(-p_{filt,diff,i}+p_{tol})=(0 \text{ bar}+30 \text{ bar})=30 \text{ bar}$$

$$p_{diff,i+1,1}=(+p_{filt,diff,i}+p_{tol})=(0 \text{ bar}+30 \text{ bar})=30 \text{ bar}.$$

This gives the following for the brake pressure demand $P_{req,i+1,0}$ and $P_{req,i+1,1}$ for the wheel 0 and the wheel 1:

$$P_{req,i+1,0}=\min(P_{req,wdc,i+1,0},P_{req,wdc,i+1,1}+p_{diff,i+1,0})=(80 \text{ bar},100 \text{ bar}+30 \text{ bar})=80 \text{ bar},$$

and $$P_{req,i+1,1}=\min(P_{req,wdc,i+1,1},P_{req,wdc,i+1,0}+p_{diff,i+1,1})=(100 \text{ bar},80 \text{ bar}+30 \text{ bar})=100 \text{ bar}.$$

This shows that limiting the brake pressure compared to the respective opposite wheel to 30 bar has no effect, because the limiting is not exceeded by the wheel-specific brake pressures demanded by the ABS controller according to the wheel dynamic criteria at 80 bar and 100 bar. Thus, unnecessary limiting of the brake pressures at the wheel 0 and the wheel 1 is avoided.

Figure 2:
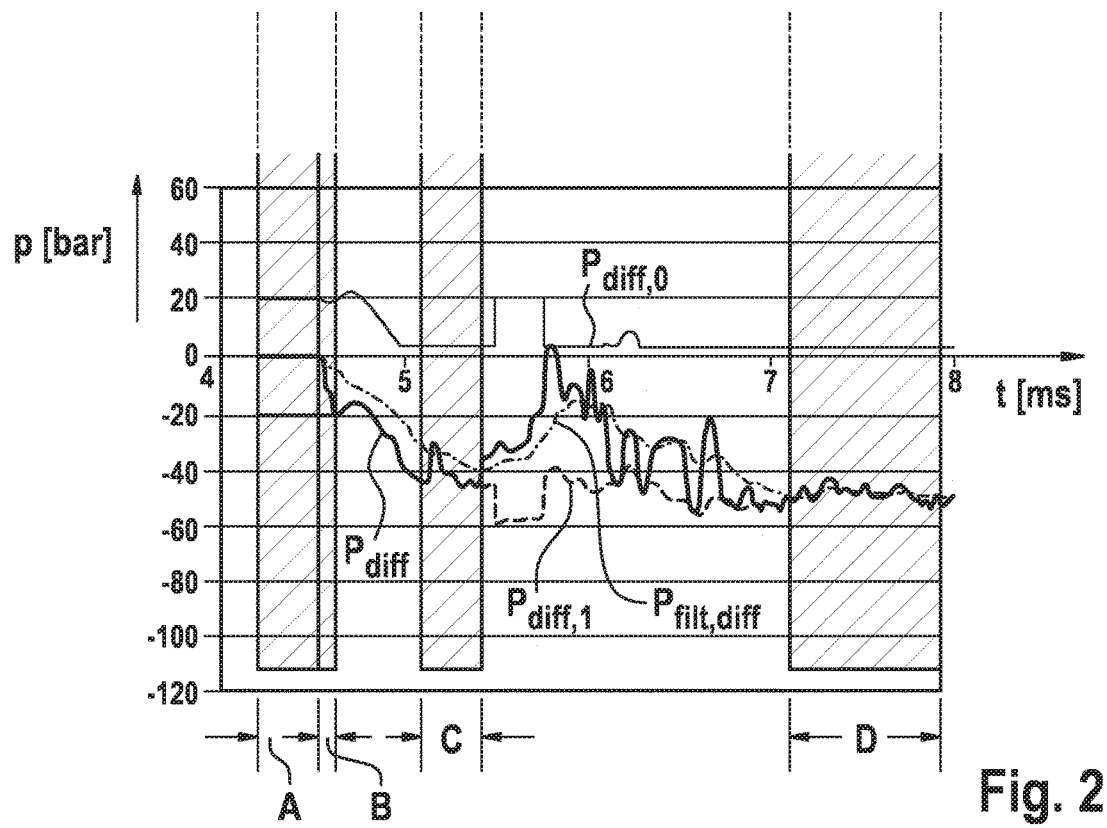
FIG. 2 shows a further t-p diagram to explain the method according to the disclosure.

The two diagrams according to FIGS. 1 and 2 show in summary the relationship between the low-pass filtered brake pressure difference, shown in FIG. 2 as the graph $p_{filt,diff}$, the position of the tolerance band resulting from the tolerance values $p_{tol}$, shown in FIG. 2 as the graph $p_{diff,0}$ for the LM-wheel 0 and graph $p_{diff,1}$ for the HM-wheel 1, and the wheel pressure profile resulting therefrom, shown in FIG. 1 as the graph $p_{R0}$, for the LM-wheel 0 and as the graph $p_{R1}$ for the HM-wheel 1. FIG. 1 also shows the profile of a stability index Stab, which indicates the vehicle stability in % values. Thus, a 0% value indicates a high level of stability of the vehicle and a 100% value indicates a low level of stability of the vehicle.

First it can be seen from FIG. 2 that the low-pass filtered brake pressure difference $p_{filt,diff}$ follows the unfiltered brake pressure difference $p_{diff}$ with a time delay.

The time intervals A, B, C and D in FIGS. 1 and 2 correspond to each other. The time intervals are described below:

Period of time A: over this period of time A, the stability index at Stab=0 indicates a high level of vehicle stability; in the period of time, the permissible maximum pressure difference values $p_{diff,0}$ for the LM-wheel 0 and the maximum pressure difference values $p_{diff,1}$ for the HM-wheel 1 lie symmetrically about the filtered brake pressure difference $p_{filt,diff}$ which has the value 0 bar in this time interval. The pressure difference values $p_{diff,0}$ and $p_{diff,1}$ therefore form a symmetrical tolerance band about the low-pass filtered brake pressure difference $p_{filt,diff}$.

Time interval B: In this time interval, the brake pressures of the LM-wheel 0 and of the HM-wheel 1 increase, where the brake pressure at the LM-wheel 0 is reduced because of ABS control (cf. profile of $p_{R0}$ and $p_{R1}$ in FIG. 1). At the same time, in accordance with the method according to the disclosure the pressure reduction at the HM-wheel 1 is limited according to graph $p_{R1}$, so that the existing pressure discrepancy runs at the lower limit of the tolerance band formed by $p_{diff,1}$ according to the profile of the unfiltered brake pressure difference $p_{diff}$ (cf. FIG. 2). The unfiltered pressure difference $p_{diff}$ is thereby held within the limits in the tolerance band.

Following the time interval B, the tolerance band is shifted so that the difference of the filtered brake pressure difference $p_{filt,diff}$ from the permissible maximum pressure difference value $p_{diff,0}$ for the LM-wheel 0 is greater than the difference from the permissible maximum pressure difference value $p_{diff,1}$ for the HM-wheel 1. The unfiltered brake pressure difference $p_{diff}$ is limited by the lower limit of the tolerance band formed by $p_{diff,1}$ in the time interval between the two time intervals B and C. The brake pressure at the HM-wheel 1 can only build up slowly according to the profile of the graph $p_{R1}$, because the filtered brake pressure difference $p_{filt,diff}$ follows the profile of the unfiltered brake pressure difference $p_{diff}$ with a time delay. The stability according to the profile of the stability index Stab increases (cf. FIG. 1).

Time interval C: In this time interval, the stability index Stab falls to −50% according to FIG. 1, i.e., the vehicle is unstable. Therefore, the tolerance band is shifted asymmetrically so that a further change of the pressure difference in the destabilizing direction, i.e., further pressure build-up at the HM-wheel 1, takes place more slowly than in the stabilizing direction. According to FIG. 2, this results in a slower increase in the pressure discrepancy towards the HM-wheel 1, as can be seen from the profile of the lower limit $p_{diff,1}$ of the tolerance band of FIG. 1.

Time interval D: In this time interval, the stability index Stab with the value of −100% indicates a high level of instability. No further asymmetrical shifting of the tolerance band takes place, the low-pass filtered brake pressure difference $p_{filt,diff}$ matches the profile of the unfiltered brake pressure difference $p_{diff}$. There is no further increase in the brake pressure difference $p_{diff}$.

The aforementioned examples 1 through 5 use the low-pass filtered brake pressure difference $p_{filt,diff,i}$ (i: ith loop) as the reference pressure difference $P_{0,i}$ (i: ith loop) for the determination of the permissible maximum pressure difference values $p_{diff,i+1,n}$ (n=0, 1) for the LM-wheel 0 and the HM-wheel 1. The filtered brake pressure difference $p_{filt,diff,i}$ (i: ith loop) is used owing to the assumption that the yaw behavior of the vehicle is determined not only by the current brake pressure difference, but by the average brake pressure difference of the recent past. Optimization of the method according to the disclosure may be achieved by determining the longitudinal force acting on the wheel as a relevant variable, which basically constitutes the decisive variable. The longitudinal force, or at least the component of the brake pressure that is implemented as a longitudinal force, may be determined by means of a correction term proportional to the measured wheel acceleration, because according to the principle of the conservation of momentum (angular momentum), the wheel acceleration results from the imbalance between the brake torque (i.e. brake pressure) and the torque from the longitudinal force in the tire contact area multiplied by the radius of the wheel. Consequently, at least if an asymmetrical shift of the tolerance band is sought depending on the degree of vehicle instability, it is not the brake pressure difference but the acceleration-corrected brake pressure difference, i.e., the longitudinal force difference acting on the wheel, that is to be filtered.

Furthermore, the examples described above use the permissible maximum brake pressure difference $p_{diff,i,0}$ and $p_{diff,i,1}$ (i: ith loop) for the LM-wheel 0 and the HM-wheel 1 for the determination of the brake pressure demand $P_{req,i+1,0}$ and $P_{req,i+1,1}$ for the wheel 0 and the wheel 1 according to the above equations (3) and (4). During this, the maximum brake pressure difference $p_{diff,i,0}$ and $p_{diff,i,1}$ is limited to the pressure demand of the respective opposite wheel according to the ABS control. At a constant brake pressure difference $p_{diff,i,0}$ or $p_{diff,i,1}$, such a pressure demand would copy all the modulations of the respective opposite wheel. According to the representation in accordance with FIG. 3, region A, the brake pressures of both wheels modulate about an average brake pressure, the brake pressure $p_1$ of the HM-wheel 1 about the average brake pressure $p_{HM}$ and the brake pressure $p_0$ of the LM-wheel 0 about the average brake pressure $p_{LM}$. The unfiltered brake pressure differences $p_{diff}$ also modulate about an average value.

In order to prevent the pressure modulation, instead of the variables $P_{req,i,0}$ and $P_{req,i,1}$ (i: ith loop) for the LM-wheel 0 and the HM-wheel 1, the average brake pressures $p_{LM}$ and $p_{HM}$ are used in equations (3) and (4):

$$P_{req,i+1,0} = \min(P_{req,wdc,i+1,0}, p_{HM}+p_{diff,i+1,0}), \text{ and} \quad (3')$$

$$P_{req,i+1,1} = \min(P_{req,wdc,i+1,1}, p_{LM}+p_{diff,i+1,1}). \quad (4')$$

Figure 3:
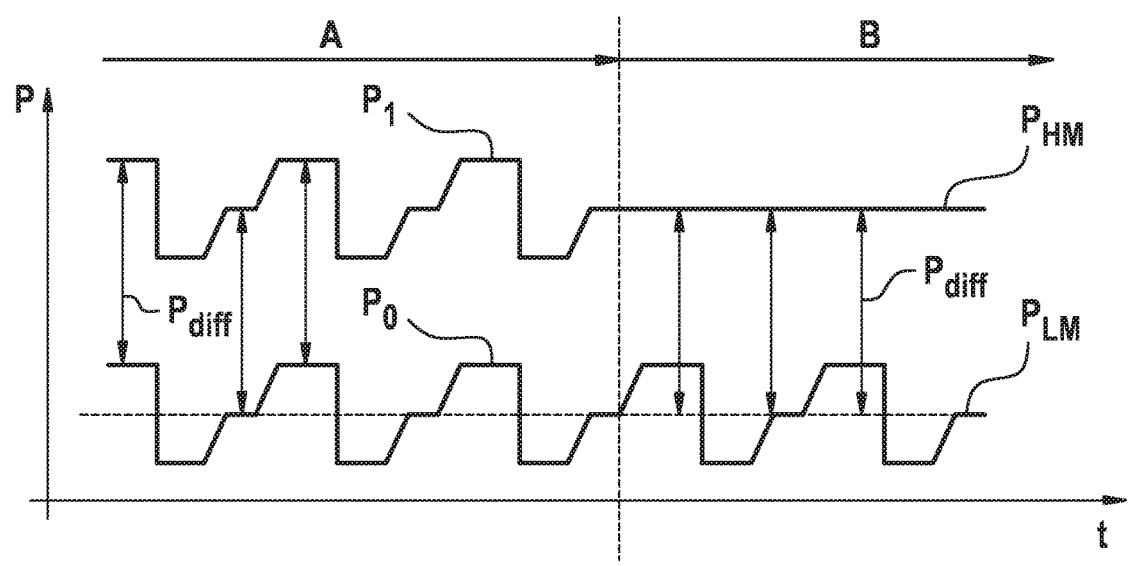
FIG. 3 shows a further t-p diagram to explain the method according to the disclosure.

This situation is illustrated in FIG. 3, region B. The unfiltered brake pressure differences $p_{diff}$ run almost constantly in the region B.

Further optimization can be achieved by detecting the longitudinal force acting on the wheel with the average brake pressures $p_{LM}$ and $p_{HM}$ by means of a correction term that is determined depending on the measured wheel acceleration. As a result, the average longitudinal force acting on the LM-wheel 0 and on the HM-wheel 1 is used.

The examples described above show that the method according to the disclosure can work in principle without a situation recognition regarding the driving stability of the vehicle, but nevertheless a yaw torque occurring on the vehicle is limited (cf. examples 1 through 4) and unnecessary interventions are avoided (cf. example 5). The method according to the disclosure may be used both for the front axle and also for the rear axle of a vehicle.

A number of implementations have been described. Nevertheless, it will be understood that various modifications may be made without departing from the spirit and scope of the disclosure. Accordingly, other implementations are within the scope of the following claims.

What is claimed is:

1. A method for adapting a control strategy of a slip control system of a brake system of a vehicle in a μ-split situation, in which wheel-specific brake pressures ($P_{req, wdc, i+1, 0}$, $P_{req, wdc, i+1, 1}$) that are defined differently from the control strategy of the slip control system are set at opposite vehicle wheels (LM-wheel 0, HM-wheel 1) of a vehicle axle, and in doing so a resulting brake pressure difference is limited, wherein:

determining a maximum wheel-specific pressure difference value ($p_{diff, i+1, 0}$, $p_{diff, i+1, 1}$) for producing a brake pressure demand ($P_{req, i+1, 0}$, $P_{req, i+1, 1}$) for the opposite vehicle wheels (LM-wheel 0, HM-wheel 1), where the maximum wheel-specific pressure difference value ($p_{diff, i+1, 0}$, $p_{diff, i+1, 1}$) deviates with a predetermined tolerance value ($P_{tol}$) from a reference pressure difference ($p_{01}$), the reference pressure difference corresponds to a value of a current low-pass filtered brake pressure difference ($p_{filt, diff, i}$), and determining the brake pressure demand for each of the vehicle wheels (LM-wheel 0, HM-wheel 1), which includes a minimum of the wheel-specific brake pressure that is determined from the control strategy of the slip control system, and a sum of:

the wheel-specific brake pressure for the opposite vehicle wheel that is determined from the control strategy of the slip control systems, and the maximum wheel-specific pressure difference value ($p_{diff, i+1, 0}$, $p_{diff, i+1, 1}$), where the maximum wheel-specific pressure difference value ($p_{diff, i+1, 0}$, $p_{diff, i+1, 1}$) deviates from the value of the current low-pass filtered brake pressure difference ($p_{filt, diff, i}$) by the predetermined tolerance value ($p_{tol}$).

2. The method of claim 1, wherein, identical tolerance values are used for the determination of the maximum wheel-specific pressure difference value for the opposite vehicle wheels.

3. The method of claim 1, wherein different tolerance values are used for the determination of the maximum wheel-specific pressure difference value for the opposite vehicle wheels.

4. The method of claim 1, wherein the brake pressure difference is modified depending on a difference of accelerations of two mutually opposite vehicle wheels and is then low-pass filtered.

5. A method for adapting a control strategy of a slip control system of a brake system of a vehicle in a μ-split situation, in which wheel-specific brake pressures ($P_{req, wdc, i+1, 0}$, $P_{req, wdc, i+1, 1}$) that are defined differently from the control strategy of the slip control system are set at opposite vehicle wheels (LM-wheel 0, HM-wheel 1) of a vehicle axle, and in doing so a resulting brake pressure difference is limited, wherein:

determining a maximum wheel-specific pressure difference value ($p_{diff, i+1, 0}$, $p_{diff, i+1, 1}$) for producing a brake pressure demand ($P_{req, i+1, 0}$, $P_{req, i+1, 1}$) for the opposite vehicle wheels (LM-wheel 0, HM-wheel 1), where the maximum wheel-specific pressure difference value ($p_{diff, i+1, 0}$, $p_{diff, i+1, 1}$) deviates with a predetermined tolerance value ($p_{tol}$) from a reference pressure difference ($p_{01}$), the reference pressure difference corresponds to a value of a current low-pass filtered brake pressure difference ($p_{filt, diff, i}$), and determining the brake pressure demand for each of the vehicle wheels (LM-wheel 0, HM-wheel 1), which includes a minimum of the wheel-specific brake pressure that is determined from the control strategy of the slip control system, and a sum of:

an average brake pressure of the opposite vehicle wheel, and the maximum wheel-specific pressure difference value ($p_{diff, i+1, 0}$, $p_{diff, i+1, 1}$), where the maximum wheel-specific pressure difference value ($p_{diff, i+1, 0}$, $p_{diff, i+1, 1}$) deviates from the value of the current low-pass filtered brake pressure difference ($p_{filt, diff, i}$) by the predetermined tolerance value ($p_{tol}$).

6. The method of claim 5, wherein for the determination of the brake pressure demand, the average brake pressure of the opposite vehicle wheel is modified depending on an average acceleration thereof.

7. The method of claim 6, wherein, identical tolerance values are used for the determination of the maximum wheel-specific pressure difference value for the opposite vehicle wheels.

8. The method of claim 5, wherein different tolerance values are used for the determination of the maximum wheel-specific pressure difference value for the opposite vehicle wheels.

9. The method of claim 5, wherein the brake pressure difference is modified depending on a difference of accelerations of two mutually opposite vehicle wheels and is then low-pass filtered.

* * * * *